United States Patent
Jacobson

Patent Number: 5,671,664
Date of Patent: Sep. 30, 1997

[54] COMBINATION BLENDER AND FOOD WASHING APPARATUS

[76] Inventor: Glenn R. Jacobson, 1950 N. Andrews Ave., Apt. No. 203D, Wilton Manors, Fla. 33311

[21] Appl. No.: 582,449

[22] Filed: Jan. 3, 1996

Related U.S. Application Data

[63] Continuation-in-part of Ser. No. 330,320, Oct. 27, 1994, Pat. No. 5,501,241.

[51] Int. Cl.⁶ .............. A47J 27/00; B08B 3/02; F26B 9/06
[52] U.S. Cl. .............. 99/536; 99/511; 99/513; 99/516; 134/95.2; 134/102.3; 134/107; 134/199; 366/102; 366/168.1; 366/314
[58] Field of Search .............. 134/25.3, 95.2, 134/102.3, 107, 153, 199, 200, 130, 187, 202, 595, 596; 99/516, 534–536, 510–513; 15/3.12; 261/84, 76, 115; 366/199, 205, 314, 102, 168.1

[56] References Cited

U.S. PATENT DOCUMENTS

| | | | |
|---|---|---|---|
| 3,666,243 | 5/1972 | Bisinella | 366/205 |
| 3,980,282 | 9/1976 | Burch et al. | 366/314 X |
| 4,030,707 | 6/1977 | Moreton | 366/205 X |
| 4,509,545 | 4/1985 | Trotter | 134/199 |
| 5,184,544 | 2/1993 | Ling | 99/536 |
| 5,454,986 | 10/1995 | Lessen | 366/314 |
| 5,501,241 | 3/1996 | Jacobsen | 134/199 |

*Primary Examiner*—Timothy F. Simone
*Attorney, Agent, or Firm*—Malin, Haley, DiMaggio & Crosby, PA

[57] ABSTRACT

A food processing apparatus for washing, aeration drying, and blending food product. The apparatus comprises a food product container having a mating lid, a mesh basket insert, and a network of tubing having a plurality of spray nozzle apertures for producing a cleansing mist, and drying airstream, directed toward the enclosed food product. The container further includes a fitting for enabling communication between the tubing network and a water source and an air source, and a valved drain outlet. Blender blades are rotatably mounted to the container floor and driven by a motorized base which supports the container during normal operating modes.

11 Claims, 3 Drawing Sheets

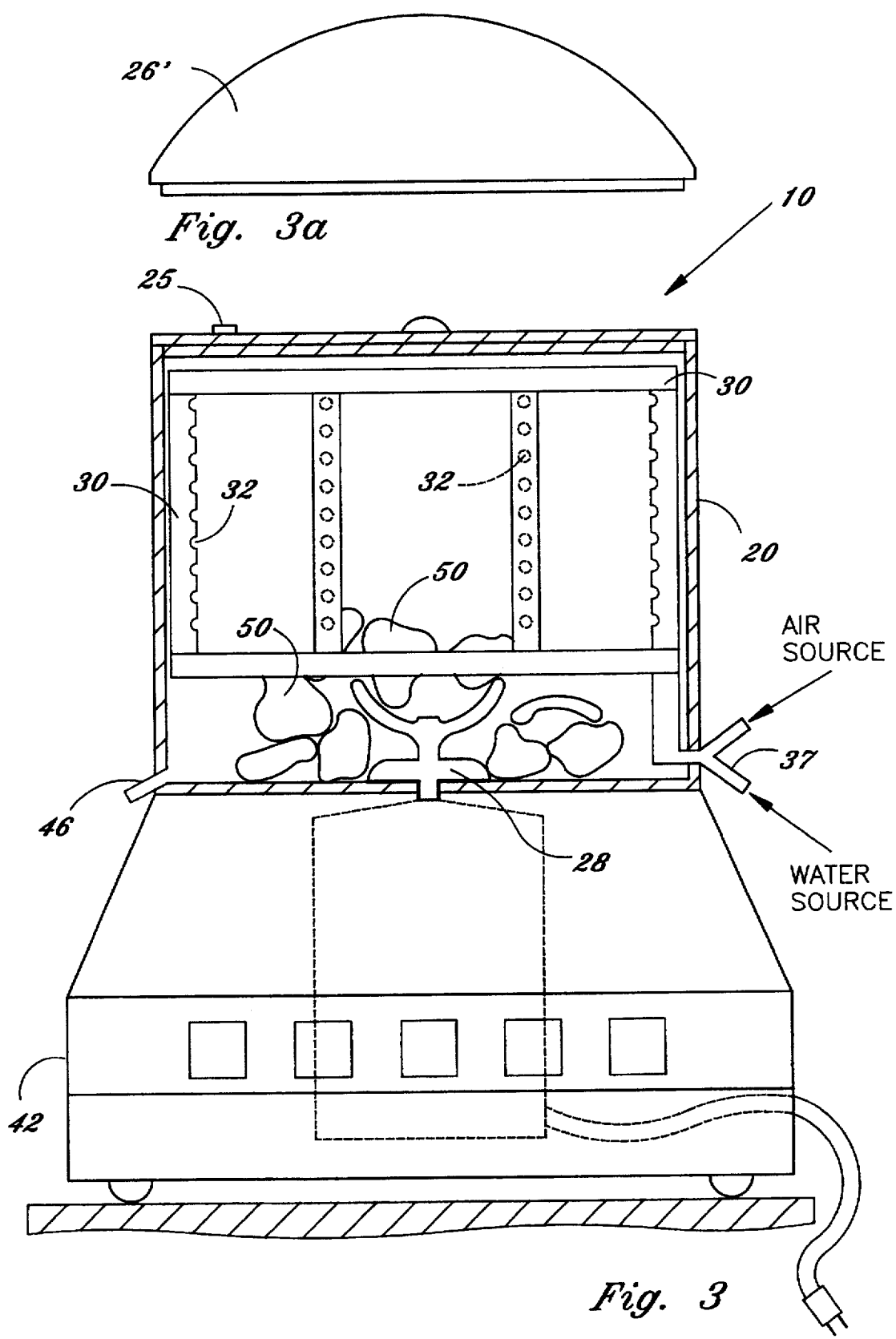

COMBINATION BLENDER AND FOOD WASHING APPARATUS

This application is a continuation-in-part of Ser. No. 08/330,320, filed Oct. 27, 1994, issued as U.S. Pat. No. 5,501,241, on Mar. 26, 1996.

BACKGROUND OF THE INVENTION

1. Field of the Invention

The instant invention relates to food processing devices, and more particularly to a combination food blender and food washing apparatus capable of washing and aerating foods, thereby removing undesirable contaminants such as chemical and particulate matter, and blending said foods in preparation for consumption.

2. Description of the Prior Art

It is common practice to clean food products such as fruits and vegetables prior to consumption so as to remove soil and chemical contaminants. Since hand washing is time consuming and inefficient when large quantities of food product are required, as in restaurants and other food service industries, mechanical washing devices have been developed.

One such device is revealed in U.S. Pat. No. 4,509,545, issued to Trotter, which discloses a portable vegetable washing container designed to maintain a continuous flow of washing liquid at a constant level, whereby water is supplied through upper and lower spray rings housed within the container, such that items to be cleaned are circulated from the bottom of the container towards the water surface, where the items are sprayed in a continuous manner, thereby removing contaminants. However, there are several inherent disadvantages associated with Trotter's device. Specifically, the vegetables remain immersed in water along with the removed contaminants, thereby limiting the effectiveness of Trotter's device since the contaminants and solution may recontaminate the vegetables by adhering to the vegetables upon drainage.

U.S. Pat. No. 4,809,723, issued to Meliconi, discloses an Appliance for washing and spin-drying lettuce, vegetables, and similar produce, comprising a basket that is rotatable about a horizontal axis of symmetry internally of a container fitted with a removable lid. Meliconi contemplates spin-drying lettuce while allowing water separated by centrifugal force to collect and drain out the bottom of the device. Meliconi recognizes, however, that spin-drying can be of limited effectiveness since for produce, especially lettuce, to dry completely, it must be rearranged and spun multiple times.

Therefore, the prior art devices have achieved only limited and partial success in automating the food product washing and drying process. In particular, the prior art drying methods of drip-drying or spin-drying have proven inefficient and, thus, a need exists for an improved means of preparing food products such as vegetables, and especially lettuce. There still exists a need for a device that both effectively washes vegetables and allows for the processing of the washed vegetables, such as blending, while requiring minimal handling of the vegetables, thereby exposing the food product to potential contamination.

SUMMARY OF THE INVENTION

It is toward solving the aforementioned disadvantages and limitations of the prior art that the instant invention is directed. The instant invention contemplates a device that improves upon the prior art by providing a single device capable of processing foods by washing, aeration, and blending. The instant invention includes a food product container having a mating top for housing a quantity of food product. The container incorporates a network of tubing in communication with an air source, and a pressurized water source, and having a plurality of perforations therein functioning as spray nozzles to facilitate washing and aeration of the enclosed food product. The network of tubing conforms substantially to the container inner surface, thereby surrounding the enclosed food product. The container further incorporates suitable exterior fittings for connection to a pressurized air source and a potable water source. The container further includes rotatable blending blades incorporated in the container floor for blending enclosed food product.

The invention contemplates the use of a mesh basket which, when inserted within the container, remains suspended from the container floor, and wherein the food product is stored. The container further includes a bottom portion incorporating a blender mixing blade for blending said food product. In addition, a motorized base is provided for mating engagement with said container for driving the blender blade.

In practice, food product, such as vegetables, is deposited in the mesh basket within the container and the lid is placed over the top of the container. Next, air is allowed to flow through the tubing thereby aerating the enclosed food product. In addition, water is allowed to flow through the network of tubing, such that the food product housed within the container is exposed to a cleansing mist resulting from water, or a mixture of water and air, exiting the tubing apertures. Water which collects at the bottom of the container exits the container through a container drain. The washed food product may thereafter be dried by aeration by allowing forced air to flow though the container tubing network. Moisture laden air is vented to the atmosphere through an appropriate pressure relief valve.

In addition, the instant apparatus functions as a blender and allows for the blending of food products. Accordingly, the container incorporates rotatable blender blades at the container floor. In the blending mode, the mesh food product basket is removed and the food product placed back in the container (i.e. without the basket). The container then functions as a blending container and the enclosed food product can be mixed and/or blended as desired by the blender blades which are selectively driven and controlled by the motorized base.

In accordance with the instant invention, it is an object thereof to provide a food processing apparatus for washing, aerating, and blending food products such as fruits and vegetables.

It is a further object of the instant invention to provide a food processing apparatus capable of washing, aerating, and blending food products, such as vegetables, while minimizing the risk of contamination between the washing and blending cycles.

Still another object of the present invention is to provide a food processing blender capable of washing and/or aerating food product, such as vegetables, without allowing the food product to soak in dirty water.

In accordance with these and other objects which will become apparent hereinafter, the instant invention will now be described with particular reference to the accompanying drawings.

BRIEF DESCRIPTION OF THE DRAWINGS

FIG. 3 is a view in partial section of the combination blender and food washing apparatus operating in the blending mode.

FIG. 3a is a view of an alternate domed lid for use with the present invention.

DESCRIPTION OF THE PREFERRED EMBODIMENTS

Figure 1:
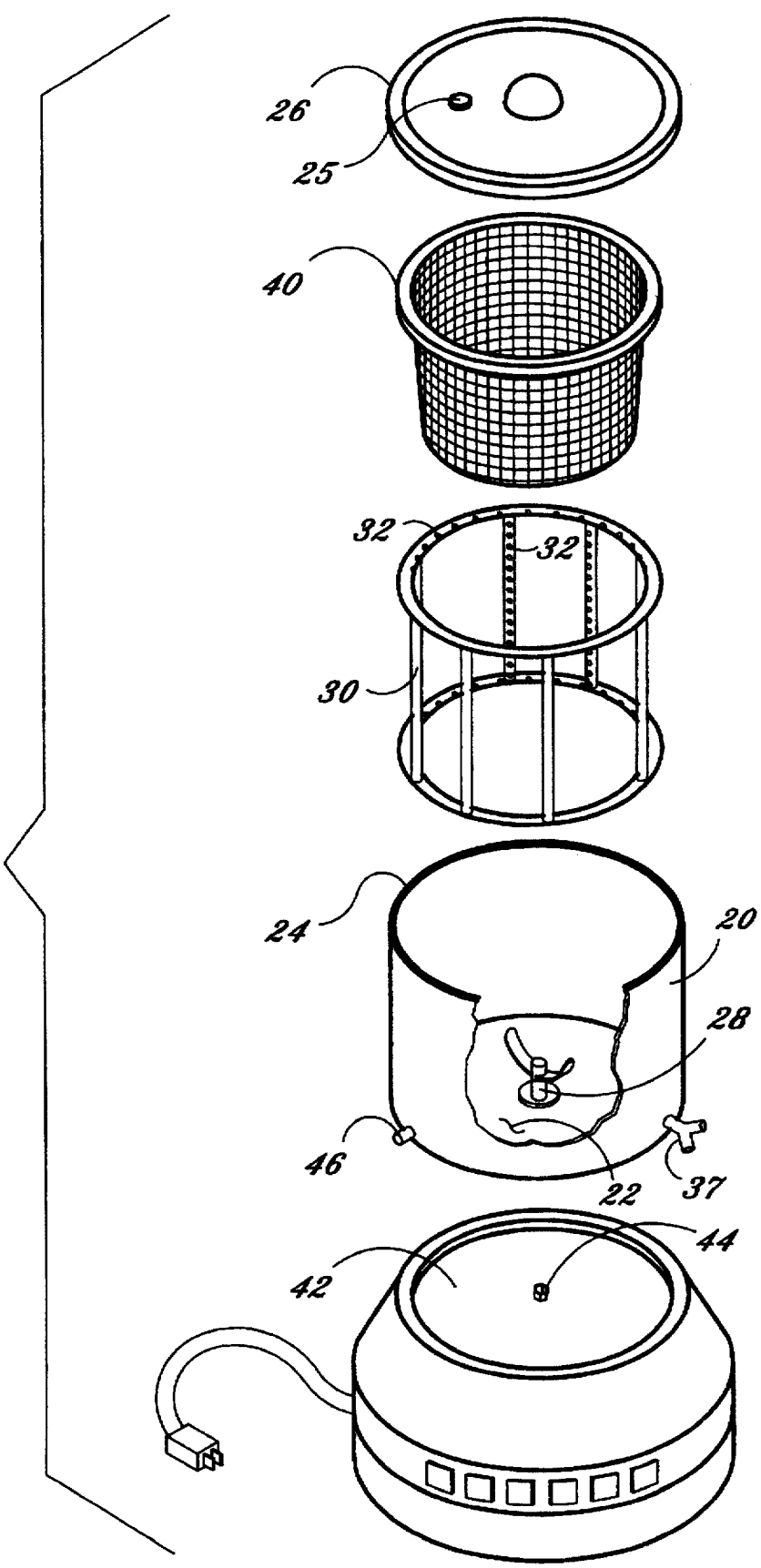
FIG. 1 is an exploded sectional view of the combination blender and food washing apparatus.
Figure 2:
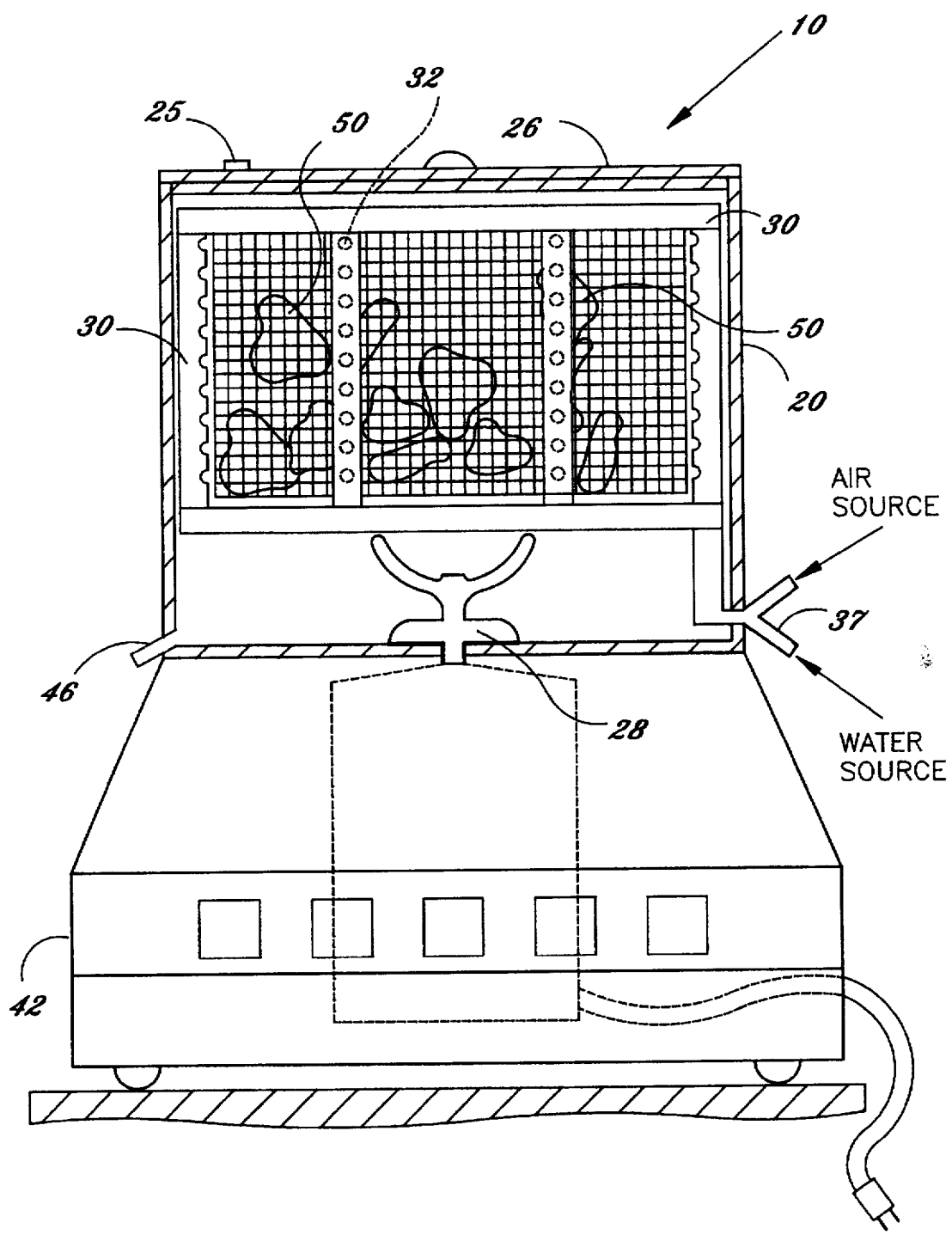
FIG. 2 is a view in partial section of the combination blender and food washing apparatus operating in the washing mode.

FIGS. 1-3 depict the instant invention generally designated 10. The invention includes a cylindrical container 20 having a floor 22 and a vertical container wall terminating at a rim 24. Container 20 may be fabricated from stainless steel, glass, plastic, or any suitable material in accordance with National Sanitation Foundation ("NSF") standards. Container 20 is sized depending on the application; a household appliance model may have a capacity of one gallon or less, while an industrial model may have a capacity of 500 gallons or more. The container houses a network of tubing 30 defining a plurality of apertures 32. Tubing 30 may be fabricated from stainless steel, plastic, or any other suitable material in accordance with NSF standards. Tubing network 30 incorporates a valved fitting 37 for facilitating simultaneous connection between tubing 30 and a potable water supply source and an air source. Valved fitting 37 shall allow either water or air, or both, to flow through tubing 30 as desired. Any suitable air source may be used with the present invention, and the air source may be housed within base 42, mounted externally to base 42, or mounted in a remote location and connected to the invention 10 at fitting 37 by air conduit.

Tubing 30 may be anchored within the container and fixed in place, or tubing 30 may be integrally formed in the container wall. A mesh basket 40 is housed within container 20 and supported such that basket 40 is elevated with respect to the container floor 22, thereby maintaining washed food product 50 above any water that may drip and pool on the container floor 22, such that the food product does not soak in the collected water.

Container 20 further includes blending blades 28 rotatably mounted at the container floor 22. Container 20 and motorized base 42 are configured for mating engagement such that container 20 is supported by base 42 during normal operation. When matingly engaged, blending blades 28 are selectively driven by a motorized base 42.

Container 20 is capped by a removable lid 26. Lid 26 may be fabricated from glass, plastic, or any other suitable material, and may be clear to allow a user to visually inspect the container's contents 50 and monitor the food preparation process. As depicted in FIG. 3a, lid 26' may also be structured to function by redirecting water, during the washing process, back down into container 20 thereby enhancing the washing effectiveness. Lid 26 fits snugly within container rim 24, thereby forming a sealed perimeter to prevent liquid from escaping the container during the washing and/or blending process. Lid 26 further incorporates a pressure relief valve 25 for allowing the escape of moisture laden air during the aeration drying process. However, the pressure relief valve 25 may be located on container 20 rather than on lid 26. Container 20 is supported by a motorized base 42 having a rotational drive section 44 for engaging blender blades 28. The motorized base 42 incorporates an electric motor (shown in phantom) conventionally powered by an electrical outlet.

Control of the washing process is accomplished by a manual on/off switch either mounted on container 20, base 42, or remotely. The washed food 50 product may then be dried by aeration. Control of the aeration process is accomplished by a manual on/off switch which, upon activation, allows pressurized air to flow through the container tubing. The air causes residual water within the container to evaporate. In certain embodiments it may be desirable to pre-cool the air prior to entry into the container to enhance moisture retention. The moisture laden air escapes through relief valve 25. Control of the blending process may be accomplished by a plurality of switches mounted on the motorized base in a similar manner as found on a conventional blender. Furthermore, control of any of the washing, aerating, or blending processes may be controlled by a timer.

Thus, the instant invention performs as follows: first, food product 50 is placed within basket 40 which is matingly received within container 20; next, lid 26 is mounted on container rim 24, providing a positive seal; an optional aeration process may be initiated thereby allowing air to flow through tubing network 30; water may then be allowed to flow from a potable water source through valve 37 into the tubing network 30, whereafter the water exits tubing apertures 32, thereby creating a fine mist; water dripping through basket 40 pools on the container floor 22, at which time it may be drained via drain 46; air is then allowed to flow from an air source through valve 37 into the tubing network 30, whereafter the air exits tubing apertures 32, thereby drying the washed food product by aeration. Moisture laden air escapes through the container pressure relief valve 25. If the user desires to blend the food product, then basket 40 is removed from container 20 and the food product placed back in container 20 (i.e., without basket 40). Drain 46 incorporates a valve for closing the drain and preventing liquid from leaving the container. The device then operates as a conventional blender and the user may select any one of a number of blending speeds by activating corresponding switches found on motorized base 42 for blending the food product.

It is contemplated that the initial aeration process may continue during the washing process such that a mixture of air and water is allowed to flow through tubing 30 and out of tubing apertures 32.

The instant invention has been shown and described herein in what is considered to be the most practical and preferred embodiment. It is recognized, however, that departures may be made therefrom within the scope of the invention and that obvious modifications will occur to a person skilled in the art.

What is claim is:

1. A food processing apparatus for aerating, washing, and blending food items comprising:

a container having a floor and a vertically extending wall terminating in a container rim, said container floor having rotatable blending means;

fluid spray nozzle means within said container for creating a fluid spray;

a mesh basket for holding food items, said basket sized for insertion within said container such that said basket is demountably supported above said container floor;

a container lid, said lid sized for mounting on said container rim;

means for selectively allowing fluid to flow through said spray nozzle means thereby creating a fluid spray within said container; and a base housing a motor and having a top surface incorporating a rotational drive section for transmitting rotational power to said blending means.

2. A food processing apparatus for aerating, washing, and blending food items according to claim 1, wherein said container lid is dome-shaped such that said domed lid functions to re-direct upward flowing fluid downward.

3. A food processing apparatus for aerating, washing, and blending food items according to claim 1, wherein said container lid is transparent thereby allowing visual inspection of food items within said container.

4. A food processing apparatus for aerating, washing, and blending food items according to claim 1, wherein said base includes a plurality of control switches for controlling the washing and blending processes.

5. A food processing apparatus for aerating, washing, and blending food items according to claim 1, wherein said container floor incorporates a drain for selectively draining fluid from said container.

6. A food processing apparatus for aerating, washing, and blending food items according to claim 1, wherein said container incorporates a transparent portion for allowing visual inspection of said food items.

7. A food processing apparatus for washing, aerating, and blending food items comprising:

a container having a floor and a vertically extending wall terminating in a container rim, said container floor having a rotatable blending blade;

tubing housed within said container, said tubing having a plurality of apertures;

a mesh basket for holding food items, said basket sized for insertion within said container such that said basket is demountably supported by said container and elevated above said container floor;

a container lid, said lid sized for mounting on said container rim;

a valve for selectively allowing fluids such as water and air to flow through said tubing whereby said fluid exits said tubing through said tubing apertures thereby creating a fluid spray; and a base housing a motor and having a top surface incorporating a rotational drive section for transmitting rotational power to said blending blades.

8. A food processing apparatus for aerating, washing, and blending food items according to claim 1, wherein said fluid is air.

9. A food processing apparatus for aerating, washing, and blending food items according to claim 1, wherein said fluid is water.

10. A food processing apparatus for aerating, washing, and blending food items according to claim 1, wherein said fluid is a mixture of air and water.

11. A food processing apparatus for aerating, washing, and blending food items comprising:

a container having a floor and a vertically extending wall terminating in a container rim, said container floor having a rotatable blending blade;

said container housing tubing, said tubing having a plurality of apertures functioning as fluid spray nozzles for creating a fluid spray within said container;

a mesh basket for holding food items, said basket sized for insertion within said container such that said basket is demountably supported above said container floor;

a transparent dome-shaped container lid, said lid sized for mounting on said container rim;

means for selectively allowing fluids, such as air for aerating food items and water for washing food items, to flow through said container tubing thereby creating a fluid spray within said container;

a fluid drain for draining fluid from said container;

a relief valve for allowing the escape of moisture laden air from said container; and a base housing a motor and having a top surface incorporating a rotational drive section for transmitting rotational power to said blending blade.

* * * * *